United States Patent [19]
Roach

[11] 3,770,169
[45] Nov. 6, 1973

[54] MOTORIZED LIQUID DISPENSER WITH AN ACCURATE DISPENSING VOLUME ADJUSTMENT

[75] Inventor: William J. Roach, Foster City, Calif.
[73] Assignee: Oxford Laboratories, San Mateo, Calif.
[22] Filed: June 14, 1971
[21] Appl. No.: 152,961

[52] U.S. Cl. .................................. 222/309, 74/586
[51] Int. Cl. .......................................... G01f 11/06
[58] Field of Search ...................... 222/309; 74/586; 92/13.4, 13.41, 12.7

[56] References Cited
UNITED STATES PATENTS
2,605,036  7/1952  Cozzoli .............................. 222/309
3,024,946  3/1962  Forsyth .......................... 222/309 X Primary Examiner—Robert B. Reeves
Assistant Examiner—Thomas E. Kocovsky
Attorney—Limbach, Limbach & Sutton

[57] ABSTRACT

A liquid dispenser of the pipette type is disclosed wherein a pump plunger is reciprocated by an electric motor to discharge a predetermined volume of liquid. The volume of liquid dispensed in one operating cycle is determined by the linear stroke length of the pump plunger. The pump plunger stroke length is in turn controlled by a novel mechanism for converting the rotary motion of the electric motor into reciprocating motion of the pump plunger. Such a motion converter is described which provides a crank having an accurate and controllable separation of two points of rotation wherein an electric motor drive shaft is connected to one of the points and a reciprocating plunger mounting is driven by the other of the points.

3 Claims, 6 Drawing Figures

PATENTED NOV 6 1973 3,770,169

INVENTOR.
WILLIAM J. ROACH
BY
Limbach, Limbach and Sutton
ATTORNEYS

INVENTOR.
WILLIAM J. ROACH

INVENTOR.
WILLIAM J. ROACH

MOTORIZED LIQUID DISPENSER WITH AN ACCURATE DISPENSING VOLUME ADJUSTMENT

BACKGROUND OF THE INVENTION

The present invention relates generally to a controllable mechanism for converting rotary motion to a linear reciprocating motion and, more specifically, to a liquid dispensing device employing such a motion converter in a manner to control the amount of liquid dispensed therefrom.

Manually operated liquid dispensing devices of the pipette type have been known and used previously. An example of such a manual device for insertion on the top of a bottle of liquid is described in U.S. Pat. No. 3,452,901, issued July 1, 1969. An improvement in such devices that significantly reduces the complexity and cost thereof is described in copending U.S. Pat. application Ser. No. 103,708, filed Jan. 4, 1971. In this copending application, a disassemblable valve assembly is described wherein most of the parts are constructed of an economical plastic material having valve inserts made of glass.

It is highly desirable that such liquid dispensers be capable of dispensing quantities of liquid within very narrow tolerances. Furthermore, it is desirable that such liquid dispensing devices be capable of controlling the amount of liquid dispensed with great accuracy.

The prospects of constructing a liquid dispenser operated by a motor rather than by hand has made it necessary to take a different approach in controlling and adjusting the amount of fluid that is dispensed by the device. Therefore, it is a primary object of the present invention to provide a motor driven liquid dispensing device wherein the amount of liquid to be dispensed in one cycle of operation may be accurately and simply controlled.

SUMMARY OF THE INVENTION

This and additional objects are accomplished by a motorized liquid dispenser of the present invention wherein a rotary motion of a driving motor is converted to a linear reciprocating motion of a syringe pump plunger by a mechanism which may be adjusted to control the length of the plunger stroke, thus to control the amount of fluid discharged in one stroke of the pump plunger. The pump includes a cylindrical barrel which is opened at one end to receive the reciprocating plunger. The other end of the pump barrel terminates in a valve mechanism which includes inlet and outlet valves. Fluid is drawn into the pump barrel through the inlet valve during an intake stroke of the pump plunger and a controlled amount of liquid is discharged through the outlet valve of the pump assembly during a discharge stroke of the pump plunger.

The rotary to linear motion converter of the present invention which provides reciprocating motion to the pump plunger includes a crank body that is connected at one end thereof to a continuously rotating motor shaft. A mount attached to one end of the pump plunger is held on the crank body by additional elements in a journaled relationship thereto at a controlled distance along the length of the crank body from the point of attachment thereof to the motor drive shaft. It is this crank separation distance that determines the stroke length of the pump plunger and thus controls the amount of fluid that is discharged from the pump in a single cycle of its operation.

The additional elements which allow an easy and accurate setting of the distance along the crank body between the motor shaft and the pump plunger journal includes both a coarse and fine adjustment thereof for accurately controlling the quantity of liquid discharged. The coarse adjustment includes mating teeth on one surface of the crank body and on one surface of a locking element. The locking element is movable along the length of the crank body when lifted slightly therefrom and forms a coarse adjustment of the crank length. A fine adjustment of the crank length is additionally provided by a vernier cam that is rotatable with respect to the locking element and the crank body. The vernier cam contains a cylindrical surface that is eccentric with respect to the center of rotation of the vernier cam element. The pump plunger mount is journaled to the outside of the eccentric cylindrical surface, thereby to cause reciprocation of the pump plunger when the crank body is rotated.

An advantage of the adjustment according to the present invention is that no wrenches or other tools are required. The setting of the stroke length of the pump plunger is practically made instantaneously by a simplehand manipulation. Accuracy and simplicity are assured by the use of separate coarse and fine adjustments. Scales are provided on the surfaces of the adjustment elements for ready visibility on the amount of fluid that is to be discharged during each cycle of pump operation.

The entire syringe pump and valve assembly is mounted on a case which encloses a pump driving motor. One end of this assembly is held to the case through the pump plunger driving mechanism. The other end of the syringe and valve assembly is preferably held to the motor case by a post to provide ready removability and to allow a certain amount of rotation of the assembly about this post. The rotary to linear motion converter and liquid volume adjustment mechanism is also constructed for easy removability of the one end of the syringe and valve assembly from the motor case. Such easy removability from the motor case makes it possible to use a single motor for sequentially dispensing different types of fluid without first having to sterilize the syringe and valve assembly. When changing from one liquid to another, clean syringe and valve assembly is quickly clipped into place on the motor casing.

For additional objects and advantages of the novel motorized liquid dispenser of the present invention, reference should be had to the following description of a preferred embodiment thereof when taken in conjunction with the accompanying drawings.

DESCRIPTION OF THE PREFERRED EMBODIMENTS

Figure 1:
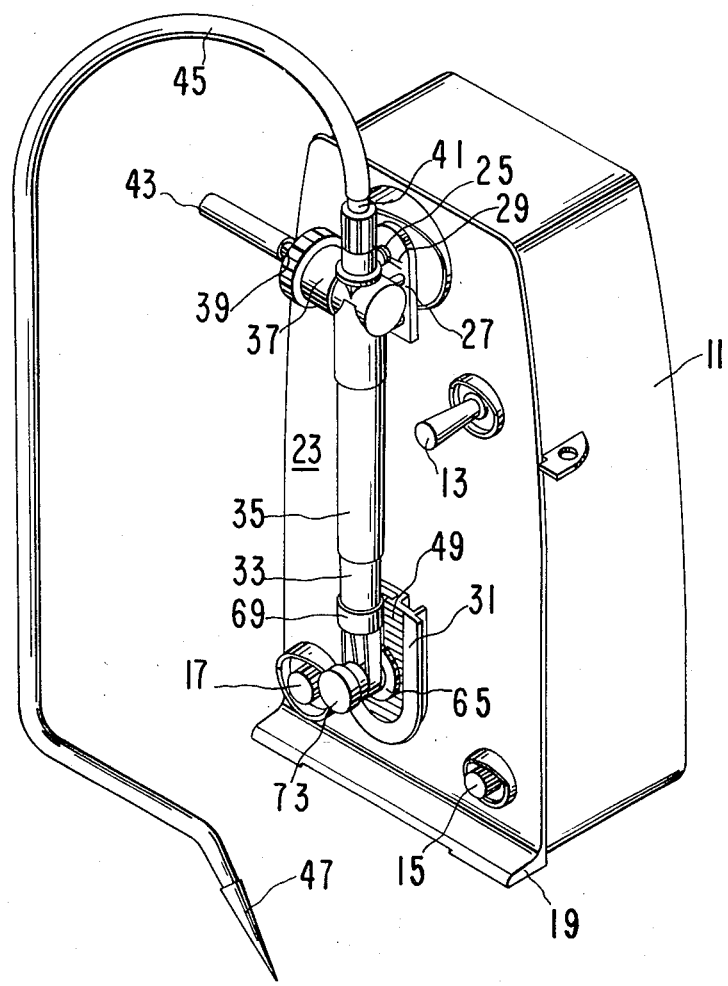
FIG. 1 is an overall view of a motorized liquid dispenser in which various aspects of the present invention are employed.

Referring to FIG. 1, an electric motor, (not shown) is enclosed in a plastic casing 11. Extending from the front of the casing 11 is a toggle switch handle 13, a fuse holder 15 and a plug 17 for connection of a remote switch. The casing 11 is constructed with a flange portion 19 extending from the front of the unit at its base to add stability for placing the case 11 on a flat surface such as a table. The motor (not shown) inside of the case 11 can be any convenient type, preferably electrically powered. This motor drives a rotating shaft 21 (FIGS. 2 and 4) which extends from the front of the case 11.

A syringe and valve assembly 23, the primary operating member of the liquid dispenser, is attached to the front face of the casing 11. The syringe and valve assembly 23 is attached at its top portion at a post 25. The post 25 is rigidly attached to the front face of the casing 11 and protrudes through an opening in a flange 27 of the syringe and valve assembly 23. A pin 29 snaps on to the post 25 in front of the flange 27, thereby to restrain the top portion of the syringe and valve assembly 23 from falling away from the casing 11 of the liquid dispenser while allowing a certain amount of rotation about the post 25.

The syringe and valve assembly 23 is held to the casing 11 at its lower end by an operable connection of a crank body 31 to the rotating drive shaft 21. The drive shaft 21 is preferably attached to the rear side of the crank body 31 by a threaded engagement therewith. The direction of the threads is such that the rotation of the drive shaft 21 by the motor in the casing 11 tightens the thread connection between the drive shaft 21 and the crank body 31.

In operation of the liquid dispenser as shown in FIG. 1, rotation of the motor within the casing 11 causes a cylindrical plunger 33 to reciprocate back and forth within a cylindrical barrel member 35. A valve assembly 37 is rigidly connected to the upper end of the barrel 35. As the plunger 33 reciprocates back and forth in the barrel 35, fluid is alternately drawn into the syringe and valve assembly 33 through an inlet opening in an intake fitting 39 and discharged through an outlet opening of an outlet fitting 41. A portion of a flexible plastic hose 43 is shown connected to the intake fitting 39 and is usually connected at its other end to a reservoir of the liquid to be dispensed. Similarly, a flexible plastic hose 45 is connected at one end thereof to the outlet fitting 41 of the valve assembly 37 while its other end is terminated into a desired container such as a test tube. The outer shell of the valve assembly 37 is made of a hard plastic, and its internal structure is described in detail hereinafter with respect to FIG. 5. The plunger 33 and the barrel 35 are each made of carefully dimensioned hollow glass cylinders.

As the motor causes the drive shaft 21 to rotate, the crank body 31 is rotated, which in turn causes the plunger 33 to reciprocate up and down within the barrel 35. As the plunger 33 descends out of the barrel 35, fluid is drawn into the syringe and valve assembly, especially its barrel 35, through an inlet opening in the intake fitting 39. As the plunger 33 rises within the barrel 35 in a compression portion of its operating stroke, fluid is discharged through an outlet opening of the outlet fitting 41 and through the discharge tube 45 into a desired receptacle. The amount of liquid discharge in one stroke depends upon the length of the compression portion of the stroke of the plunger 33 as it travels upward within the barrel 35. This compression stroke length is accurately adjustably controlled by a mechanism which operably connects the plunger 33 with the rotating crank body 31.

Figure 2:
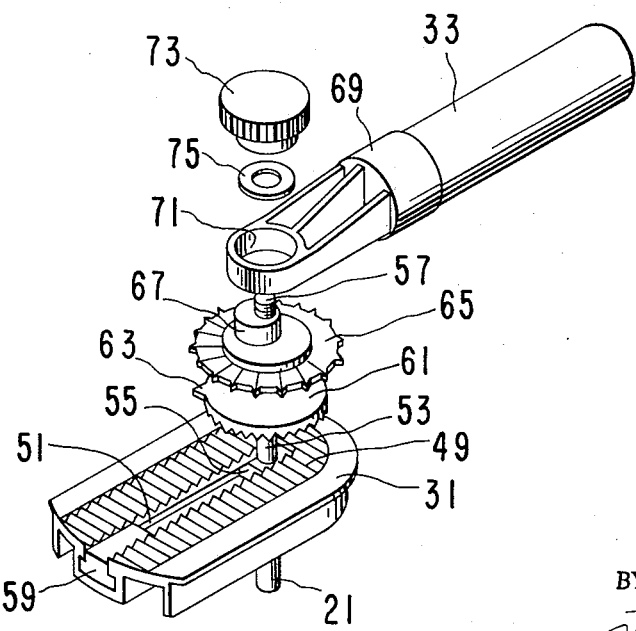
FIG. 2 is an exploded view of one end of the syringe and valve assembly of FIG. 1 which shows the elements of the rotary to linear motion converter.

Referring especially to FIG. 2, the crank body 31 has a plurality of periodically recurring surface identations or undulations 49. The undulations 49 effectively form a plurality of teeth in the face of the crank body 31 which extends outward away from the face of the dispenser casing 11. A slot 51 is provided across the crank body 31 in one direction through the area thereof occupied by the surface undulations 49. A bolt 53 has a bolt head 55 that is captured by the slot 51 in a manner that the bolt 53 cannot rotate or shift axially along its length. The bolt 53 extends through the slot 51 away from the crank body 31 and is threaded at an end 57 that is furthest removed from the crank body 31 and which is the end opposite of that occupied by the bolt head 55. The bolt 53 is permitted to slide back and forth relative to the crank body 31 in the slot 51. A plug 59 is provided at one end of the slot 51 to prevent the bolt 53 from slipping out of the slot 51.

A locking piece 61, having a pointer 63, has surface undulations on its underside that match and mate with surface undulations 49 of the crank body 31. The bolt 53 passes through a hole in the middle of the locking piece 61. Therefore, it can be seen that the position of the bolt 53 along the slot 51 of the crank body 31 may be fixed and locked by pressing together the mating undulations of the locking piece 61 and the crank body 31.

A vernier cam 65 is also carried by the bolt 53 through a hole in the center of the vernier cam 65. The vernier cam piece 65 has formed as a part thereof a cylindrical surface 67 that is eccentric with respect to the bolt 53. The glass plunger 33 is terminated at one end in a plastic mount and bearing piece 69. The plunger mount 69 has an opening 71 in its end furthest removed from its connection with the plunger 33. The opening 71 is a circular one of a size to fit over the cylindrical surface 67 of the vernier cam element 65. As the crank body 31 rotates, the cylindrical surface 67 rotates with respect to the opening 71 of a plunger mount and thus provides a journaled connection with the plunger 33 to convert rotary motion into a reciprocating plunger motion. A knob 73 is threaded to fit on the threaded end 57 of the bolt 53 so that it may clamp together the crank body 31, the locking piece 61, the vernier cam 65 and the plunger mount 69 during the period that fluid is being dispensed.

Figure 3:
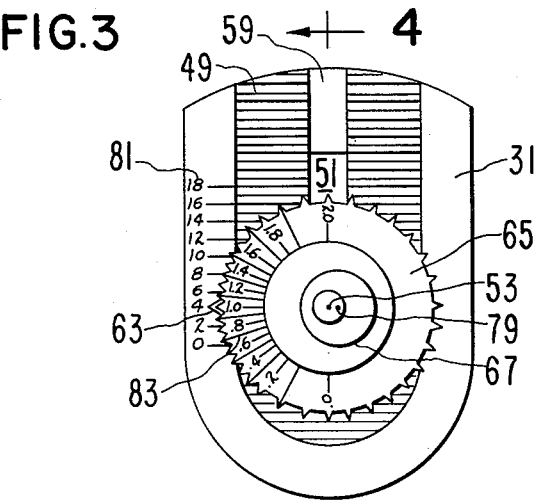
FIG. 3 is an enlarged front view of the rotary to linear motion converter of FIG. 1 with an example of specific liquid volume discharge amounts that may be selected.
Figure 4:
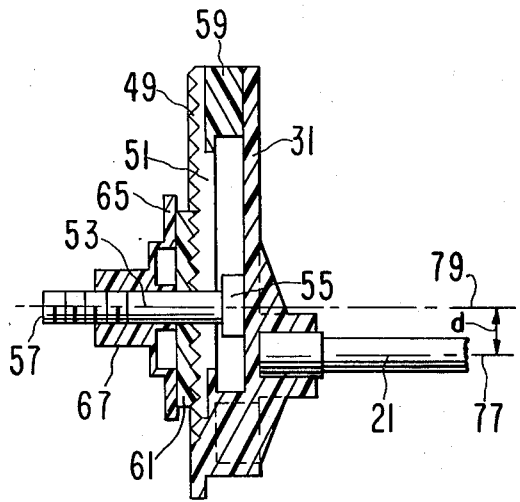
FIG. 4 is a sectional view of the adjustable rotary to linear motion converter taken across section 4—4 of FIG. 3.

The cross-sectional side view of the rotary to linear motion converter and adjustment mechanism of FIG. 4 best illustrates the operation of the motion converter which is also shown in FIGS. 2 and 3. The drive shaft 21 rotates about a center of curvature 77. It can be seen from FIG. 4 that the mechanism of FIGS. 2–4 provides a linearly adjustable crank. The locking piece 61 may be lifted away from the teeth 49 of the crank body 31 and moved therealong, thereby to move the bolt 53 with respect to the drive shaft 21. This moves the cylindrical surface 67 which is the driving member for reciprocating the plunger mount 69 and the plunger 33. Rotation of the vernier cam 65 about the bolt 53 also causes a translation of the cylindrical surface 67 with respect to the motor drive shaft 21. The former may be considered a coarse adjustment and the latter a fine adjustment of the linear length of a crank arm which drives the plunger 33. With these two adjustments, a center 79 of the cylindrical surface 67 is moved with respect to the center of rotation 77 of the drive shaft 21. If these two centers of rotation are separated a distance $d$ (FIG. 4), then the plunger 37 will be reciprocated a total length in a working stroke of $2d$. As pointed out hereinabove, the coarse and fine adjustments of the linear crank arm control the amount of fluid displaced in a single stroke of the plunger 33 into the barrel 35 for a given size of plunger and barrel.

The locking member 61 is oriented so that its pointer 63 lies adjacent a scale 81 (FIG. 3) that is formed along one side of the crank body 31 in a direction parallel with the direction of the slot 51 therein. FIG. 3 shows a scale 81 ranging from 0 to 18 units, the units being generally milli-liters. The pointer 63 may be set at any one of the milli-liter volume numbers shown on the scale 81 by releasing the knob 73, lifting the locking piece 61 from its engagement with the andulations 49 of the crank body 31 and moving the locking piece 61 to an appropriate position relative to the crank body 31. This also moves the bolt 53 along the slot 51 of the crank body 31. This accomplishes a coarse adjustment of the fluid quantity displaced.

In order to provide a fine adjustment of the volume of liquid that is displaced upon one stroke of the plunger 33, a scale 83 is provided on the face of the vernier cam 65. To accomplish this fine adjustment, the vernier cam 65 is rotated, thereby moving the center 79 of the cylindrical driving surface 67 relative to the drive shaft 21. This movement results from the fact that the center 79 is eccentric of the center of the bolt 53 about which the vernier cam 65 is rotated. In the specific example shown in FIG. 3, the volume displaced by the dispenser is the total of the readings of the scales 81 and 83. In the setting shown in FIG. 3, the dispenser is programmed to discharge 5 milli-liters of liquid during each reciprocating cycle of the plunger 33. The use of the fine adjustement vernier cam 65 with its eccentric surface 67 results in extremely high accuracy in the volume of liquid dispensed.

Referring again to FIG. 1, it is advantageous for many applications to provide a control apparatus for the motor enclosed in the casing 11 that allows either automatic continuous operation of the dispenser or manually controlled intermittent operation. Therefore, the switch 13 is preferably a three-position switch in which the middle position turns the machine off. One side of the neutral off position is spring loaded and the other side position of the switch 13 is not. When the switch 13 is pushed away from the off position to the spring loaded side, the machine will dispense liquid only as long as the operator keeps the switch handle 13 so positioned. An operator will use this position of the switch when he desires to fill only one or a very few containers with liquid. When the switch is thrown in the other direction, the motor within the casing 11 will run continuously, and, thereby periodically discharge the desired liquid quantity. This continuous operation of the machine is advantageous for filling a large number of test tubes or other containers where the operator merely moves the discharge hose 45 and its tip 47 from container to container in a time interval between the discharge liquid pulses.

The plastic parts of the liquid dispenser described with respect to FIGS. 1-4 are constructed of an inert material such as polypropylene which resits the corrosive effects of the liquids which are dispensed by the machine. The plastic parts of FIG. 2 are preferably made from a glass filled nylon material that is dimensionally stable and structurally strong as well as being resistive to the corrosive effects of liquids that are dispensed by the machine.

Figure 5:
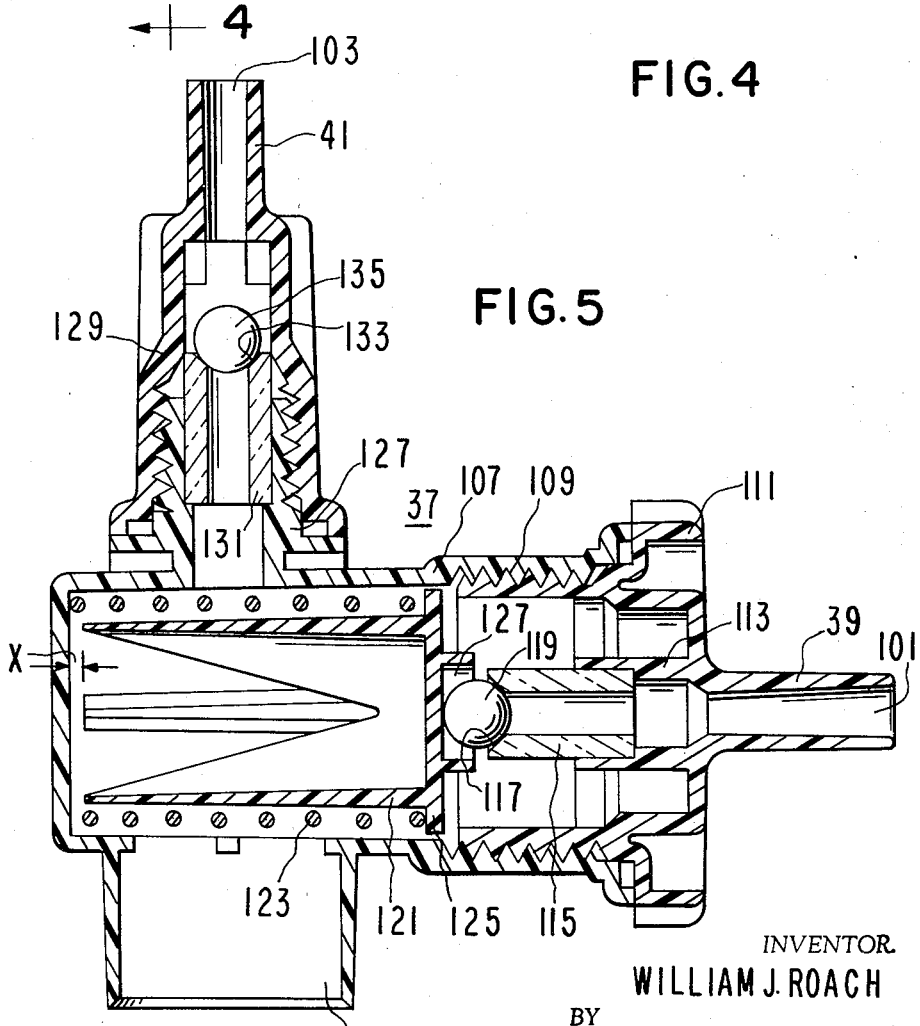
FIG. 5 is a broken view of the intake and outlet valve assemblies of the liquid dispenser of FIG. 1.

A cross-sectional internal view of the valve assembly 37 of FIG. 1 is shown in FIG. 5. Referring to FIG. 5, liquid is drawn in through an inlet opening 101 of the intake connection 39 and is discharged through an outlet opening 103 of the outlet connection 41. The cylindrical glass barrel 35 (not shown in FIG. 5) fits within the cylindrical plastic portion 105. A tubular housing 107 is provided with internal threads 109 which cooperate with external threads of a hollow cylindrical plug 111 that carries the outwardly projecting intake connection 39. The plug 111 includes a hollow cylindrical sleeve portion 113 for receiving a cylindrical sleeve 115 of a highly dimensionally stable material such as glass. The sleeve 115 is provided with a conical valve seal 117 on the inner end thereof. A spherical ball 119, preferably made of a ceramic material, seats on the valve seat 117 and is held in place by a ball retaining sleeve 121 that is slidably supported within the tubular housing member 107. The ball retaining sleeve 121 is biased toward the valve sleeve 117 by a glass spring 123 having one end bearing against the closed end of the tubular housing 107 and its other end bearing against a radially outwardly expanding flange 125 on the ball retainer sleeve 121.

A ball capturing cylindrical sleeve 127 projects from the retainer sleeve 121 toward the valve sleeve 117 to hold the ball 119 in place when the valve assembly is first assembled. The sleeve 121 is provided of such a length that when the plug 111 is inserted into the housing 107, the sleeve is only able to move a specified distance X against the spring when reduced pressure is established in the housing 107 by pumping to open the valve 119. This distance X is small enough so that the ball 119 will lift from the valve seat 117 but will be retained sufficiently closer to so as not to drop from position in front of the valve seat 117. The spring 123 is preferably made of glass so that, as an inert material, the spring is compatible with any reagent used in the dispensing device.

A tubular member 107 contains an upward projection 127 as part of an outlet valve assembly. The projection 127 contains threads on its outside surface which mate with threads on the inner surface of a cap 129. A hollow cylindrical sleeve 131, preferably made of glass material, is provided with a conical valve seat 133. The cylindrical sleeve 131 is held by the upward projection 127. A spherical ball 135, preferably made of a ceramic material, is normally biased by gravity to seat on the valve seat 133. The outlet opening 103 is in liquid communication with the chamber within the tubular sleeve 107 in which the ball retainer sleeve 121 is fitted. On a pressure stroke of the syringe assembly, the ball valve 135 is lifted from its gravity biased position against the valve sleeve 133 and fluid is caused to flow through the outlet opening 103.

Except for the cylindrical sleeves 115 and 131, the spherical ball valve 119 and 135, and the glass spring 123, the valve assembly shown in FIG. 5 is preferably constructed of an inert plastic material such as polypropylene. The advantage of such a construction is that the low cost advantage of plastic materials is maintained while at the same time providing reliability and proper functioning of the valves by the use of a more dimensionally stable material inserted at just a few locations within the plastic valve assembly.

Figure 6:
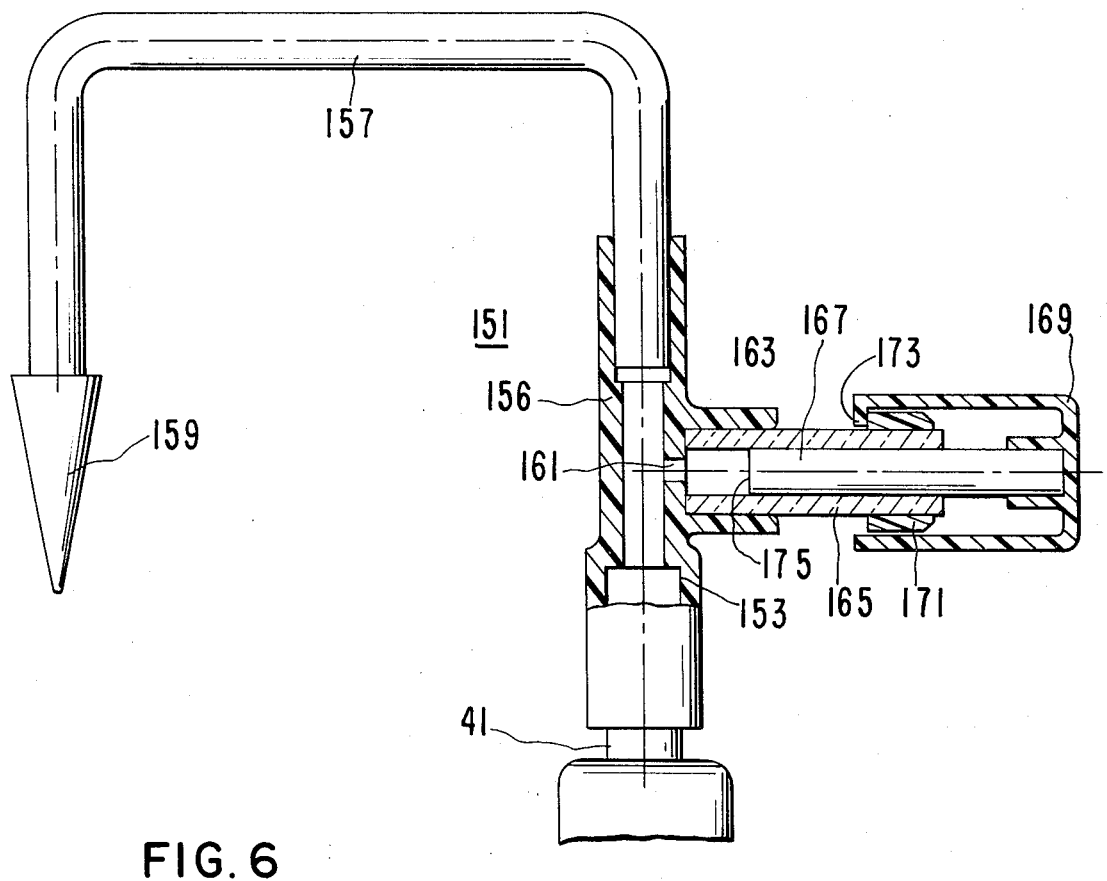
FIG. 6 is a partially cutaway view of another embodiment of the present invention.

FIG. 6 shows a partially cut-away view of a dilutor attachment which may be used in conjunction with the motorized sampler described above with respect to FIGS. 1–5. Referring to FIG. 6, a dilutor attachment 151 is frictionally held on the outlet 41 of the valve assembly 37 (FIG. 1) and may be removed therefrom merely by pulling the dilutor attachment 151 upward. The outside surface of the outlet 41 and an inside surface 153 of the dilutor intake 155 are constructed to be of substantially the same shape in order to complement each other to form a seal therebetween when the dilutor attachment 151 is positioned on the outlet 41.

The dilutor 151 provides a direct liquid path from the outlet 41 through its body 156 and a conduit 157 for discharge through a tip 159. The body 156 has an opening 161 on a side thereof that is surrounded by a cylindrical protrusion 163. A hollow cylindrical pump barrel 165 has one end firmly inserted in the cylindrical protrusion 163. A pump plunger 167 is slideably inserted in the barrel 165. One end of the plunger 167 is firmly attached to a knob 169. Movement of the plunger 167 is limited in a direction away from the barrel 165 by a band 171 that is firmly attached to the outside of the barrel 165. The knob 169 includes a hook 173 that abutts against the band 171 as the knob 169 is pulled away from the barrel 165. Movement of the plunger 167 in a direction into the barrel 165 is limited by a plunger end 175 abutting against the outside siurface of the body 156. All parts of the dilutor attachment of FIG. 6 are preferably constructed of a plastic material such as polypropylene except for the barrel 165 and the plunger 167 which are preferably made of glass to form a good seal therebetween. The conduit 157 may also be of glass.

In operation of the dilutor attachment, the conduit 157 is first filled with the liquid being dispensed by the motorized dispenser of FIGS. 1 – 5. The plunger 167 (FIG. 6) is then in its closed position with its end 175 abutted against the body 156. The tip 159 is then inserted into a different liquid such as a blood sample. The knob 169 is then manually pulled outward until its hook 173 abutts against the band 171. An accurately predetermined volume of fluid is then drawn into the barrel 165, and thus the same volume of different fluid such as blood is drawn into the tip 159. The motorized dispenser is then started to discharge the different fluid such as blood into an appropriate container along with a controlled amount of diluting liquid from the motorized dispenser. The band 171 may be adjusted by the manufacturer of the device to individually set the volume of a different liquid that is drawn into the tip 159 upon withdrawing the knob 169.

It will be understood that the motorized liquid dispenser of the pipette type described above with respect to the drawings is only an example of a device using the present invention in its various aspects and that this description is not limiting of the invention beyond the definition of the appended claims.

I claim:

1. A liquid dispenser capable of discharging selected quantities of liquid, comprising:
    a rotating shaft extending through a case,
    an elongated pump and valve assembly attached to said case, said pump and valve assembly including liquid inlet and outlet openings in liquid communication with a pump chamber having a plunger therein, the reciprocation of said plunger causing liquid to be drawn into said pump chamber through said inlet opening and discharge from said pump chamber through said outlet opening,
    a crank body having a connector to receive said rotating shaft for rotating said crank body about a first axis,
    a vernier cam element manually rotatable about a second axis, said plunger being held by said vernier cam element in a manner to rotate about a third axis that is separated a finite distance from said second axis, and
    means connecting the crank body with the vernier cam in a manner to allow said vernier cam second axis to be displaced a linear distance along the crank body and to allow rotation of the vernier cam about its said second axis with respect to the crank body,
    whereby setting the linear distance displaced between the first and second axes is a coarse adjustment of the volume of liquid that is dispensed through the outlet valve in one stroke of the plunger, and whereby rotation of the vernier cam about the second axis is a fine adjustment of a liquid volume so dispensed in one plunger stroke.

2. A liquid dispenser capable of discharging selected quantities of liquid, comprising:
    a liquid pump assembly including inlet and outlet openings in lqiuid communication with a pumping chamber having a piston therein, reciprocation of said piston causing liquid to be drawn into said pump chamber through said inlet opening and to be discharged from said pump chamber through said outlet opening,
    a crank body capable of receiving rotary motion about a given center of rotation, said crank body having a coarse adjustment scale extending along one direction from said given center of rotation,
    a fastening element captured by said crank body and slidable therealong in said one direction,
    means for selectively fixing said fastening element to said crank body along said one direction at a desired position along the coarse adjustment scale,
    a vernier cam element having a circular fine adjustment scale and attached to said fastening element for rotation about an axis thereof, said vernier element having an eccentric cylindrical surface with a center axis that is displaced a distance from the axis of said fastening element, and
    an elongated shaft journaled at one end to the cylindrical surface of said vernier cam element and mechanically connected at its other end to said piston,
    whereby the piston reciprocates a stroke distance within the pump chamber that is controlled by the position along said one direction of the crank body where the fastening element is fixed as well as the rotatable position of said vernier cam element, thereby to provide coarse and fine adjustments of the liquid volume discharged through the pump outlet opening during one complete stroke of the piston.

3. A liquid dispenser according to claim 2, wherein said means for selectively fixing and fastening element to said crank body includes a locking piece carried by said fastening element between said vernier cam element and said crank body, said locking piece and said crank body having mating surfaces which include a plurality of complementary surface undulations for holding the locking piece and the crank body against relative lateral movement for a plurality of positions of said fastening element along said one direction of said crank body.

* * * * *